Jan. 2, 1934.  H. W. KRAG  1,941,988
DUST COLLECTOR
Filed July 11, 1932   2 Sheets-Sheet 2

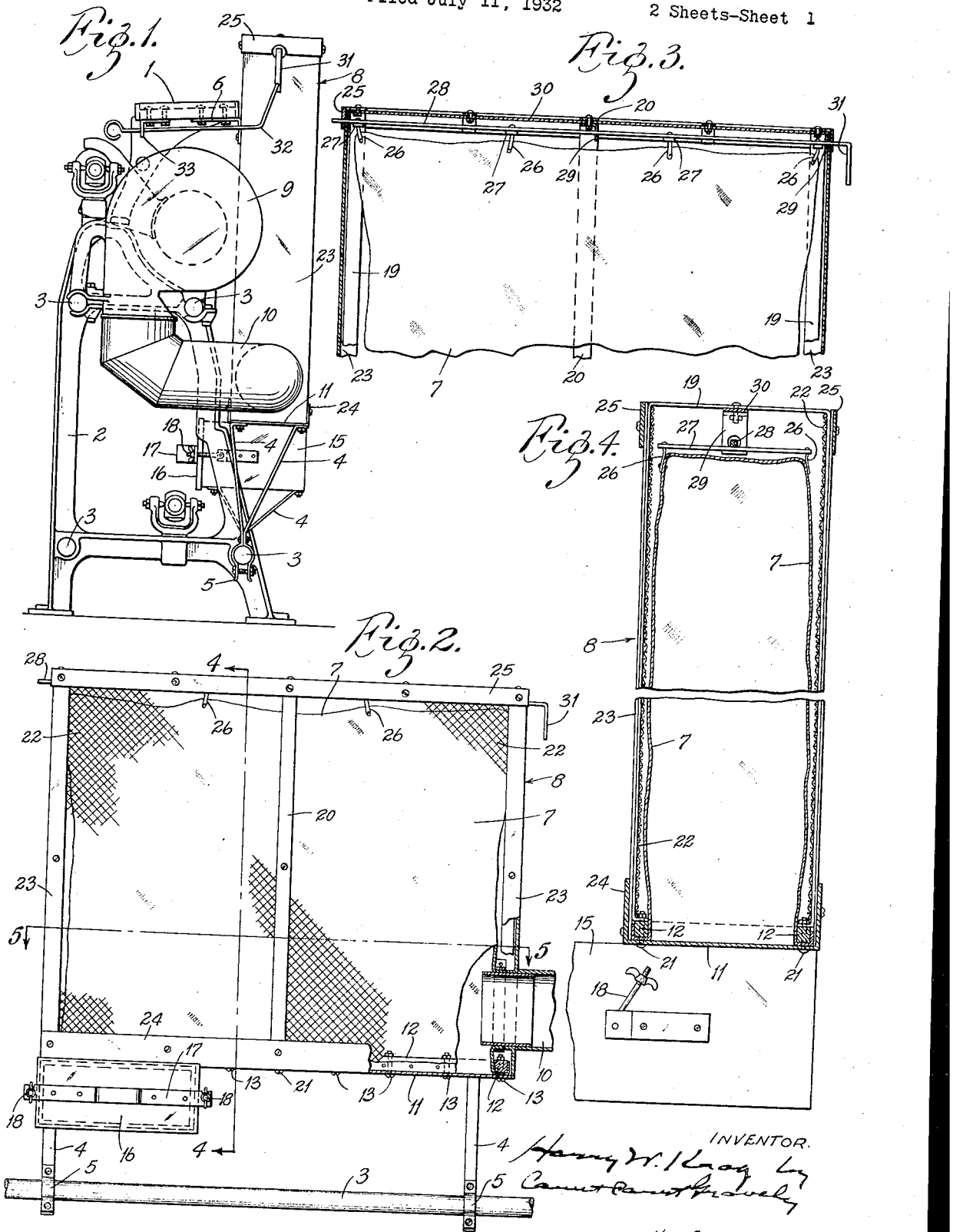

INVENTOR:
H. W. Krag
HIS ATTORNEYS.

Patented Jan. 2, 1934

1,941,988

UNITED STATES PATENT OFFICE 1,941,988

DUST COLLECTOR

Harry W. Krag, St. Louis, Mo., assignor to American Shoe Machinery and Tool Company, St. Louis, Mo., a corporation of Missouri Application July 11, 1932. Serial No. 621,817

12 Claims. (Cl. 183—58)

This invention relates to dust collectors, especially dust collectors of the bag type, and is particularly applicable to shoe finishing machines for collecting loose particles of the sanding wheels or work thrown off during the abrading operation. It has for its principal objects to provide a simple, efficient, economical, and compact dust collector which can be quickly and easily mounted on the shoe finishing machine without alteration thereof; to provide means for shaping the dust collector bag; to remove the dust therefrom; to provide a removable drawer for accumulating the dust; and to provide means for confining the inflated bag. The invention consists in the dust collector and in the construction, combinations and arrangements of parts hereinafter described and claimed.

Figure 5:
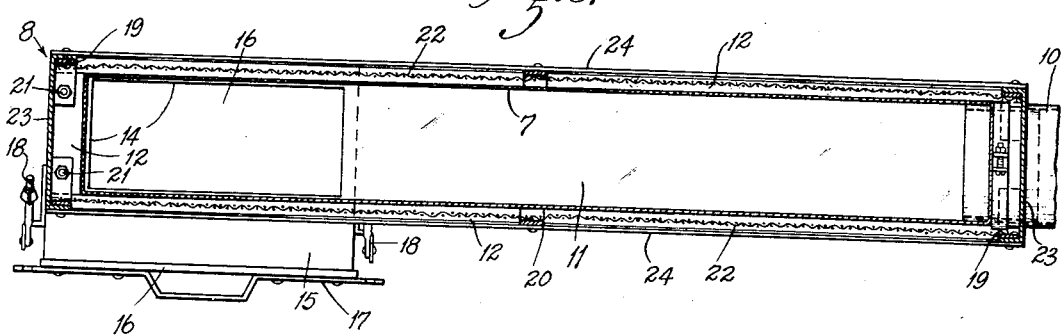
Figure 6:
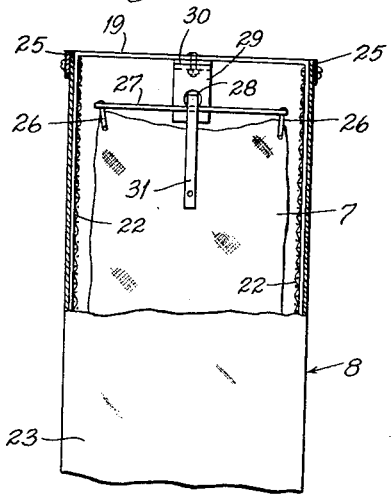
Figure 8:
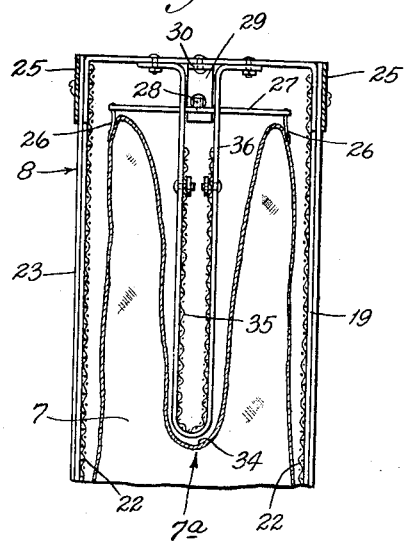
Figure 7:
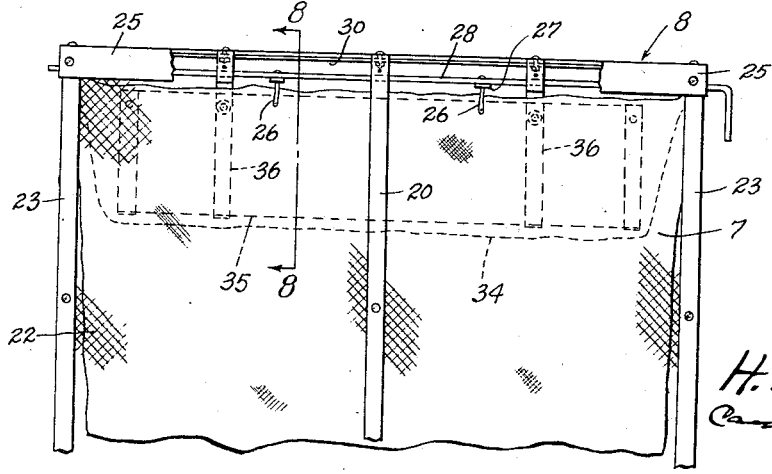

In the accompanying drawings, which form part of this specification and wherein like symbols refer to like parts wherever they occur, Fig. 1 is an end view of a shoe finishing machine equipped with a dust collector embodying my invention, Fig. 2 is a front elevation of the dust collector with parts shown broken away, Fig. 3 is a vertical longitudinal section through the upper portion of the dust collector, Fig. 4 is an enlarged vertical transverse section through the dust collector on the line 4—4 in Fig. 2, Fig. 5 is an enlarged horizontal section through the dust collector on the line 5—5 in Fig. 2, Fig. 6 is an end view with parts shown in vertical section, Fig. 7 is a front elevation of the upper portion of a dust collector of modified construction, and Fig. 8 is an enlarged vertical transverse section on the line 8—8 in Fig. 7.

Referring to Fig. 1 of the accompanying drawings, my dust collector is shown mounted on the rear side of a shoe finishing machine in position to collect loose particles of the sanding wheels or work thrown off during the abrading operation. The shoe finishing machine comprises a work supporting shelf 1 supported on end frames 2 which are connected by suitable tie rods 3. This type of shoe finishing machine is well known, and it is considered unnecessary to describe it in detail. The dust collector is mounted on the rear, lowermost tie rod of the framework of the machine by means of suitable brackets 4 secured to band clamps 5 which are clamped on the tie rod. The collector is also attached to the work supporting shelf of said machine by suitable brackets 6.

The dust collector comprises an inverted bag of fabric or analogous material 7 which is mounted in an upright rectangular casing 8 and a suitable fan 9 mounted on one end of the machine with its inlet opening in position to receive the dust produced by the machine and with its outlet opening communicating with the lower end of the collector bag 7 through a suitable pipe 10 which passes through the adjacent end of the casing and is suitably connected to the end of said bag near the bottom thereof.

The bag casing has a flat bottom member 11 of sheet metal, or the like; and the lower edges of the inverted bag are turned beneath and secured to wooden cleats 12 which are fixed to the metal bottom of the casing around its borders by means of bolts 13 so that the metal bottom member of the casing also serves as a bottom for the collector bag. The metal bottom has an opening 14 therethrough opposite the dust receiving end of the bag, and secured to the underside of the metal bottom directly below the opening is a case 15 having a drawer 16 slidably mounted therein for receiving the dust collected in the bag and constituting a dust depository. The drawer is provided at its front end with a cross bar 17 whose ends extend beyond the side edges of the drawer case and are notched to receive fasteners 18 which are pivoted to the side walls of the drawer case and serve to hold the drawer in place.

The metal bottom member of the bag casing supports upright end frame members 19 and an intermediate frame member 20 of substantially inverted channel-shape with their lower ends bent inwardly and resting on the tops of the wooden cleat members; and the frame members are held in place by bolts 21 extending through their bent-in bottom portions, through the wooden cleats and through the metal bottom member. The openings in the sides of the frame work of the bag casing are covered by means of panels of wire netting 22 which serve to confine the inflated dust collector bag within the casing, but which permit a free flow of air from the sides of the bag. Preferably, the ends of the casing are enclosed by sheet metal panels 23 which are secured to the end frame members in any suitable manner; and the front and rear sides of the casing are provided with suitable lower border panels 24 and upper border panels 25.

The closed upper end of the bag has oppositely disposed tape strips 26 sewed thereto along each side thereof which are tied to the ends of lever arms 27 fixed to a rock shaft 28 which extends longitudinally of the bag casing from end to end thereof. The rock shaft 28 is rotatably supported in brackets 29 which are secured to a longitudinal strip member 30 fixed to the tops of the inverted channel-shaped end and intermediate frame members of the bag casing. The rock shaft 28 is provided at one end with a crank 31 which is actuated by means of a shaker handle 32 which is slidably mounted in a bracket 33 secured to the underside of the work supporting shelf 1 of the finishing machine. By this arrangement, in the event that fine dust collects on the inside of the bag and forms a crust which tends to prevent the air from escaping through the bag, the shaker handle is actuated, thus causing the rocker shaft to oscillate and move the bag supporting arms up and down. This action operates to stretch or tighten one side of the bag and loosen or slacken the opposite side, thereby causing the dust which adheres to the sides of the bag to fall to the bottom thereof where it is carried by the air current to the drawer at the end of the casing. It is noted that when the fan is running, the sides of the bag are pressed tightly against the sides of the casing, thereby preventing the bag from being shaken. This feature is desirable as the shaking of the bag when the fan is operating causes the dust to work through the bag.

In the modified form of my dust collector, the collector bag is telescoped at its top as at 7a to form a relatively deep depression 34 therein, and a U-shaped frame of wire netting, or the like, depends into the depression in the upper end of the bag for maintaining the depression in the bag when the collector is in operation. The frame 35 is held in place and secured to U-shaped stirrups 36 having their upper ends flanged outwardly and bolted to suitable inverted U-shaped cross members provided at the top of the bag casing. In this construction, a greater bag surface area is obtained, and as the frame for maintaining the depression in the bag extends only part way into the depression, the bag can be readily shaken when the collector is not in operation.

Obviously, the constructions hereinabove described admit of considerable variations without departing from the spirit of my invention; accordingly, I do not wish to be limited to the precise constructions shown and described.

What I claim is:

1. A dust collector comprising a frame, a bag suspended therefrom and having a stiff bottom, said bag having an air inlet opening in one end above its bottom, and a dust depository opening into said bag through its bottom adjacent to the end of said bag opposite the air inlet end thereof.

2. A dust collector comprising a casing, an inverted bag hung loosely in said casing and having its lower edges fixed to the bottom of said casing so that the bottom of said casing constitutes a bottom for the bag, said bag having an air inlet opening in one end, and a dust depository opening into said bag through the bottom of said casing adjacent to the end of said bag opposite the air inlet end thereof.

3. A dust collector comprising a casing, a bag suspended therein, and means connected to the opposite sides of said bag for alternately tightening and slackening one side of said bag while simultaneously slackening and tightening the other side thereof.

4. A dust collector comprising a casing, a rocker shaft horizontally mounted therein, a simple cross-member fixed on said shaft, a collector bag suspended at one side from one end of said cross-member and at its opposite side from the other end of said cross-member, and means for oscillating said shaft to tighten one side of the bag and slacken the opposite side thereof.

5. A dust collector comprising a casing having a flat bottom, a rocker shaft mounted in said casing, cross-arms fixed to said shafts, an inverted bag suspended from said cross-arms and having its lower edges fixed to the bottom of said casing, and means for oscillating said shaft to shake said bag and cause particles adhering to its sides to fall to the bottom thereof.

6. A dust collector comprising a casing, a rocker shaft mounted thereon, cross arms fixed to said rocker shaft, an inverted bag in said casing and having its lower edges fixed to the bottom of said casing, strips secured to the ends of said cross arms and to the top side edges of said bag, and means for oscillating said shaft whereby opposite sides of said bag are alternately tightened and slackened.

7. A dust collector comprising a casing, a rocker shaft mounted therein, a bag suspended from said rocker shaft and having an air inlet opening, means for oscillating said shaft to shake said bag, a fan communicating with said air inlet opening, and perforated means at the sides of said casing for confining said bag to the space within said casing.

8. A dust collector comprising a casing, a bag suspended loosely therein and having an air inlet opening and having a portion of the bag telescoped to form a depression therein, a fan communicating with said air inlet opening, means around the sides of said casing for confining said bag to the space within said casing, and a frame secured to said casing and extending into the depression in said bag for maintaining such depression.

9. A dust collector comprising a casing, an inverted bag in said casing having its upper portion telescoped to form a depression in its top, means connected to said bag adjacent to the sides of said depression and to said casing for suspending said bag therein, said connecting means being movable for shaking said bag, and a frame secured to said casing and extending part way into the depression in the bag.

10. A dust collector comprising a casing, an inverted bag in said casing having its upper portion telescoped to form a depression in its top, a rocker shaft mounted in said casing above said bag, cross arms fixed to said rocker shaft, strips secured to the ends of said cross arms and to the top edges of the bag on each side of the depression in said bag, means for oscillating said rocker shaft, and a frame secured to said casing and extending part way into the depression in the bag for maintaining the depression therein.

11. The combination of a shoe finishing machine, a casing mounted thereon, a rocker shaft mounted therein, an inverted dust collector bag suspended from said rocker shaft and having its lower edges fixed to the bottom of said casing, a shaker handle supported on said shoe finishing machine and connected to said rocker shaft for oscillating the same, said bag having an air inlet opening in its end, a dust depository opening into said bag through the bottom of said casing opposite the air inlet end of the bag, and a fan mounted on said machine with its inlet opening in position to receive the dust produced by the machine and with its outlet opening communicating with the inlet opening of the dust collector bag.

12. A dust collector comprising a support for a dust bag, a rocker shaft mounted on said support, radial arms projecting from opposite sides of said shaft and attached to the opposite sides of said dust bag, and means for oscillating said shaft whereby the opposite sides of said bag are alternately tightened and slackened.

HARRY W. KRAG.